(12) United States Patent
Wolf et al.

(10) Patent No.: US 8,028,957 B2
(45) Date of Patent: Oct. 4, 2011

(54) FORCE ASSISTING SYSTEM FOR LUGGAGE SYSTEM

(75) Inventors: Christian Wolf, Neu-Ulm (DE); Oleg Graf, Illertissen (DE)

(73) Assignee: Airbus Deutschland GmbH, Hamburg (DE)

(*) Notice: Subject to any disclaimer, the term of this patent is extended or adjusted under 35 U.S.C. 154(b) by 669 days.

(21) Appl. No.: 11/860,847

(22) Filed: Sep. 25, 2007

(65) Prior Publication Data

US 2008/0073462 A1    Mar. 27, 2008

Related U.S. Application Data

(60) Provisional application No. 60/826,753, filed on Sep. 25, 2006.

(30) Foreign Application Priority Data

Sep. 25, 2006 (DE) .......................... 10 2006 045 189

(51) Int. Cl.
*B64D 11/00* (2006.01)
(52) U.S. Cl. .................................... 244/118.5
(58) Field of Classification Search ............... 244/118.5, 244/118.1; 296/33.7, 33.8; 312/247, 268, 312/370
See application file for complete search history.

(56) References Cited

U.S. PATENT DOCUMENTS

| | | | |
|---|---|---|---|
| 5,441,218 A | * | 8/1995 | Mueller et al. ............. 244/118.1 |
| 5,567,028 A | * | 10/1996 | Lutovsky et al. ............ 312/246 |
| 5,934,615 A | * | 8/1999 | Treichler et al. ........... 244/118.5 |
| 6,045,204 A | * | 4/2000 | Frazier et al. .................. 312/247 |
| 6,756,910 B2 | * | 6/2004 | Ohba et al. .................. 340/686.6 |
| 7,090,314 B2 | * | 8/2006 | Burrows et al. ............... 312/246 |
| 7,143,977 B2 | * | 12/2006 | Graf et al. ................... 244/118.1 |
| 7,258,406 B2 | * | 8/2007 | Stephan et al. ............... 312/246 |
| 2002/0153453 A1 | * | 10/2002 | Kamstra .................... 244/118.5 |
| 2004/0016847 A1 | * | 1/2004 | Ritts ........................... 244/118.5 |
| 2008/0078871 A1 | * | 4/2008 | Munson et al. ............ 244/118.5 |

FOREIGN PATENT DOCUMENTS

| | | |
|---|---|---|
| DE | 4335151 | 4/1995 |
| DE | 10222124 | 11/2003 |
| DE | 102004049700 | 4/2006 |
| WO | WO03033346 | 4/2003 |
| WO | WO03097457 | 11/2003 |

* cited by examiner

*Primary Examiner* — Tien Dinh
(74) *Attorney, Agent, or Firm* — Wood, Herron & Evans, LLP

(57) ABSTRACT

A system for reducing the manual force required to move a lowerable shell of a luggage compartment in a passenger aircraft includes a load determination device for determining a load acting on the lowerable shell of the luggage compartment, and a state detection device for detecting whether the lowerable shell is in a closed position or an open position. The system also includes a force assisting device for applying a constant assisting force which opposes the load acting on the lowerable shell. The system further includes an actuating device adapted to move the force assisting device from a first inactive operating state to a second active operating state when the lowerable shell is in the open position and the load acting on the lowerable shell exceeds a predetermined threshold value.

13 Claims, 8 Drawing Sheets

FORCE ASSISTING SYSTEM FOR LUGGAGE SYSTEM

This application claims the benefit of U.S. Provisional Patent Application No. 60/826,753, filed on Sep. 25, 2006, and German Patent Application No. 10 2006 045 189.9, filed on Sep. 25, 2006.

TECHNICAL FIELD

The invention relates to a force assisting system which is especially suitable for use in a luggage compartment with a lowerable shell in a passenger aircraft. The invention also relates to a luggage compartment with a lowerable shell which is equipped with a force assisting system of this kind.

BACKGROUND OF THE INVENTION

Luggage compartments with a lowerable shell are currently used in passenger aircraft in particular, as they advantageously enable space to be utilised in an optimum manner and at the same time a high level of operating convenience to be attained. The lowerable shell can be pivoted out of an upper closed position, in which the passengers seated under the luggage compartments are guaranteed optimum headroom, into a lower open loading and unloading position. Even relatively short people can easily deposit items of luggage in the shell and remove them from the shell in the loading and unloading position. In order to reduce a manual force which is required to pivot the lowerable shell between its lower open loading and unloading position and its upper closed position, luggage compartments which are used in passenger aircraft are frequently equipped with a force assisting device for providing an assisting force when opening and/or closing the luggage compartments.

A luggage compartment with a lowerable shell comprising a force assisting device disposed at the back of the luggage compartment is known from DE 102 22 124 A1. The force assisting device is connected to the lowerable shell of the luggage compartment by means of a cable guided over return pulleys and is equipped with a gas pressure spring for producing a required assisting force. The force assisting device is capable to adapt the provided assisting force to the loading state of the lowerable shell, so that a user has to apply an at least substantially invariable closing force, which is independent of the loading state of the lowerable shell, in order to push the lowerable shell upwards and to close the luggage compartment.

DE 10 2004 049 700 A1 describes a force assisting device which is intended to be used in conjunction with a luggage compartment with a lowerable shell and which enables an assisting force provided by the force assisting device to be controlled purely mechanically. The force assisting device comprises a gas pressure spring, which is articulated in a pivotable manner to a rocking lever, and an adjustment device, which enables the rocking lever to be pivoted and therefore the assisting force which is provided by the force assisting device to be adapted in dependence on a load which is determined by a load determination device.

The known force assisting devices have the disadvantage of a relatively high weight and a relatively high installation space requirement. Moreover, they consist of a relatively large number of individual components and are relatively complex in terms of their technical function.

SUMMARY OF THE INVENTION

The object of the invention is to provide a force assisting system which is in particular suitable for use in a luggage compartment with a lowerable shell in a passenger aircraft, is of a simple and sturdy construction, is of a low weight and has a low installation space requirement. A further object of the invention is to provide a luggage compartment with a lowerable shell which is equipped with a force assisting system of this kind.

These objects are achieved by a force assisting system having the features which are described in detail below.

A force assisting system according to the invention which is in particular suitable for use in a luggage compartment with a lowerable shell in a passenger aircraft comprises a load determination device for determining a load acting on the lowerable shell of the luggage compartment. The load determination device can in particular be used to determine the load which is applied to the lowerable shell by an item of luggage which is placed in the lowerable shell of the luggage compartment. The force assisting system according to the invention also comprises a force assisting device which is adapted to be inactive in a first operating state and active in a second operating state. The force assisting device does not provide an assisting force in its first inactive operating state, so that the lowerable shell of the luggage compartment must be pivoted solely through the manual force of a user from its lower open loading and unloading position into its upper closed position. On the other hand, in its second active operating state the force assisting device provides a constant assisting force which opposes the load acting on the lowerable shell of the luggage compartment. Finally, the force assisting system according to the invention comprises an actuating device which is adapted to move the force assisting device out of its first inactive operating state into its second active operating state if the load which is determined by the load determination device and acts on the lowerable shell of the luggage compartment exceeds a predetermined threshold value.

In the force assisting system according to the invention the force assisting device remains in its first inactive operating state as long as the load acting on the lowerable shell of the luggage compartment lies below the predetermined threshold value. The force assisting device of the force assisting system according to the invention is consequently always in its first inactive operating state when no item of luggage is placed in the lowerable shell of the luggage compartment and the luggage compartment is therefore unladen. When the luggage compartment is in the unladen state, automatic opening of the luggage compartment is therefore guaranteed due to the unladen weight of the lowerable shell, wherein the movement of the lowerable shell can be damped by means of an oil pressure damper, for example.

As the force assisting device only has two operating states, namely the first inactive operating state, in which the force assisting device does not provide an assisting force, and the second active operating state, in which the force assisting device provides a constant assisting force, a force assisting device of a simple and compact structure can be used in the force assisting system according to the invention. The force assisting system according to the invention is therefore distinguished by a low degree of complexity, a low installation space requirement and a low weight.

The load determination device is preferably adapted to determine a weight force acting on the lowerable shell of the luggage compartment and/or a weight moment acting on the lowerable shell of the luggage compartment. The load determination device may, for example, comprise a weighing floor with a weighing plate which forms a floor of the lowerable shell of the luggage compartment and is mounted on a plurality of weight sensors. When an item of luggage is placed in the lowerable shell of the luggage compartment, a planar weight force acts on the floor of the lowerable shell which is formed by the weighing plate, which force can be easily and reliably detected by the weight sensors. Furthermore, an appropriate arrangement of the sensors in the weighing floor allows a position of an item of luggage disposed in the lowerable shell of the luggage compartment relative to a pivot point of the lowerable shell to be determined and thus the weight moment applied by the item of luggage to the lowerable shell of the luggage compartment to be ascertained.

A predetermined value of a weight force which is applied by an item of luggage disposed in the lowerable shell of the luggage compartment to the lowerable shell can therefore be selected as the predetermined threshold value which is decisive for transferring the force assisting device from its first inactive operating state to its second active operating state. However, alternatively or additionally to this, a predetermined value of a weight moment which acts on the lowerable shell in consequence of an item of luggage disposed in the lowerable shell of the luggage compartment can also be selected as the predetermined threshold value for transferring the force assisting device from its first inactive operating state to its second active operating state.

The determination of a weight moment acting on the lowerable shell of the luggage compartment and the use of a predetermined weight moment threshold value for transferring the force assisting device from its first inactive operating state to its second active operating state is in particular of advantage when a pivot point of the lowerable shell of the luggage compartment is disposed such that a backwards pivoting weight moment, i.e. a weight moment acting in the closing direction of the lowerable shell, can also be applied to the lowerable shell by an item of luggage introduced into the lowerable shell.

The constant assisting force which is provided by the force assisting device of the force assisting system according to the invention is lower than a predetermined weight force threshold value at which the actuating device moves the force assisting device out of its first inactive operating state into its second active operating state. Alternatively or additionally to this, an assisting moment which is provided by the force assisting device of the force assisting system according to the invention and results from the constant assisting force produced by the force assisting device and the position of the force assisting device relative to the pivot point of the lowerable shell of the luggage compartment is lower than a predetermined weight moment threshold value at which the actuating device moves the force assisting device out of its first inactive operating state into its second active operating state.

If a luggage compartment with a lowerable shell which is equipped with the force assisting system according to the invention is designed for a service load of a maximum of 60 kg, for example, the force assisting device is preferably moved by the actuating device out of its first inactive operating state into its second active operating state when a service load which corresponds to half the maximum service load, i.e. 30 kg, is introduced into the lowerable shell of the luggage compartment. In other words, a weight force and/or a weight moment which result(s) from a service load of 30 kg in the lowerable shell of the luggage compartment are/is preferably selected as the predetermined threshold value for activating the force assisting device. This ensures that a user does not have to apply an excessive manual force to close the luggage compartment, so that the luggage compartment can be conveniently operated irrespective of its loading.

The force assisting device is at the same time preferably designed such that the assisting force which it provides or the assisting moment which it provides only compensates for a service load of 25 kg. This ensures that a luggage compartment which is equipped with the passively acting force assisting system according to the invention also automatically opens in the loaded state when the force assisting device is in its second active operating state.

The force assisting system according to the invention preferably also comprises a state detection device which is adapted to detect whether the lowerable shell of the luggage compartment is in its upper closed position or in its lower open loading and unloading position. For example, the state detection device can comprise a touch sensor which is disposed at a limit stop fitted to a side wall of the lowerable shell of the luggage compartment and interacts with a corresponding stop element rigidly fixed to the structure. The stop element may, for example, be fastened to a side wall of the luggage compartment which is rigidly fixed to the structure. However, instead of a touch sensor, the state detection device may also comprise an optical sensor, an induction sensor, strain gauge, a capacitive distance meter or a pressure sensor.

In a particularly preferred embodiment the force assisting system according to the invention comprises an electronic control unit which is adapted to activate the actuating device in dependence on the load which is determined by the load determination device and acts on the lowerable shell of the luggage compartment and/or the position of the lowerable shell of the luggage compartment which is detected by the state detection device. The force assisting system can then be operated in a particularly energy-efficient manner, as the system only requires control current to operate the load determination device and to activate the actuating device.

The electronic control unit, which is preferably formed as an analogue control unit, for example as a memory-programmable control unit, preferably receives signals from the load determination device and calculates from these signals a weight force acting on the lowerable shell of the luggage compartment and/or a weight moment acting on the lowerable shell of the luggage compartment. The weight force/weight moment acting on the lowerable shell of the luggage compartment which is thus determined can then be compared by the electronic control unit with a corresponding predetermined threshold value. Finally, the electronic control unit can deliver a corresponding trigger signal to the actuating device of the force assisting system according to the invention if the weight force/weight moment acting on the lowerable shell of the luggage compartment exceeds the corresponding predetermined threshold value.

The electronic control unit can in a similar way receive from the state detection device signals from which the electronic control unit can determine whether the lowerable shell of the luggage compartment is in its upper closed position or in its lower open loading and unloading position. The electronic control unit preferably only then delivers a trigger signal to the actuating device, upon the receipt of which the actuating device moves the force assisting device out of its first inactive operating state into its second active operating state, when the lowerable shell of the luggage compartment is in its lower open loading and unloading position.

The actuating device of the force assisting system according to the invention may comprise an electric motor or a switchable magnet. The electric motor may, for example, be formed as an electric stepping motor and drive a threaded rod of a spindle drive.

The force assisting device of the force assisting system according to the invention preferably comprises a switchable gas pressure spring which is guided telescopically in a hollow cylindrical overtube. When the force assisting device is in the first inactive operating state, the gas pressure spring is displaced telescopically in the hollow cylindrical overtube when the luggage compartment equipped with the force assisting device according to the invention is opened or closed. However, no relative movement takes place between a cylinder and a piston of the gas pressure spring. On the other hand, when the force assisting device is in the second active operating state, the gas pressure spring is supported in the overtube, while the piston of the gas pressure spring is displaced relative to the cylinder of the gas pressure spring and applies the spring force which is produced by the gas pressure spring to a bearing point of the gas pressure spring at the lowerable shell of the luggage compartment.

The actuating device of the force assisting system according to the invention preferably acts on a valve of the switchable gas pressure spring in order to move the force assisting device out of its first inactive operating state into its second active operating state or out of its second active operating state into its first inactive operating state. For example, a threaded rod which is driven by an electric motor can interact with a corresponding switching device in order to open or to close the valve of the switchable gas pressure spring. The switchable gas pressure spring is activated and the force assisting device of the force assisting system according to the invention therefore moved into its second active operating state by opening the valve.

A luggage compartment according to the invention with a lowerable shell comprises a force assisting system as described above.

BRIEF DESCRIPTION OF THE DRAWINGS

A preferred embodiment of a force assisting system according to the invention and of a luggage compartment according to the invention with a lowerable shell is described in detail in the following on the basis of the accompanying schematic drawings, of which.

DETAILED DESCRIPTION

Figure 1:
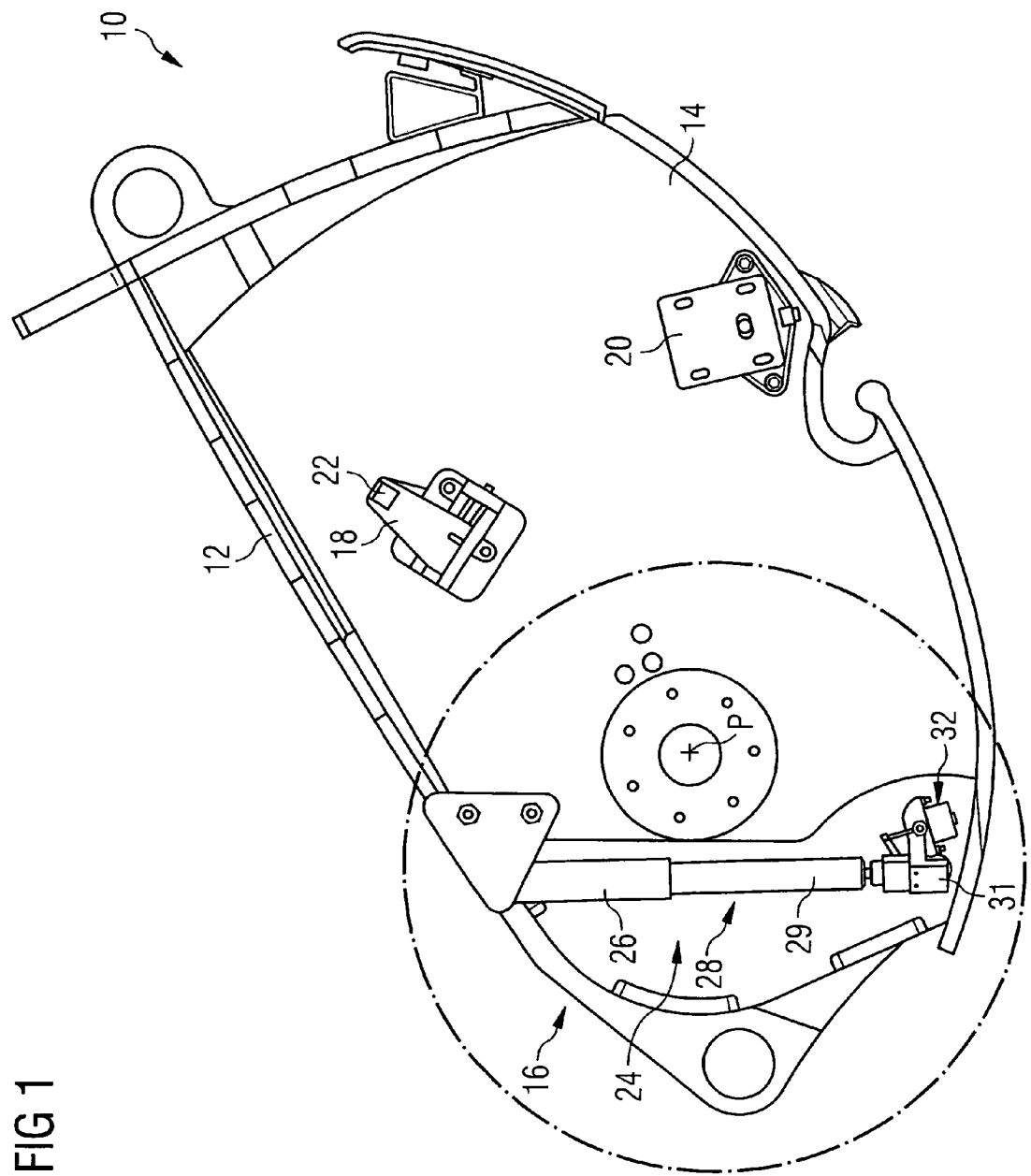
FIG. 1 shows a luggage compartment according to the invention with a lowerable shell in the closed state, in which a force assisting device of a force assisting system according to the invention is in its first inactive operating state.
Figure 3:
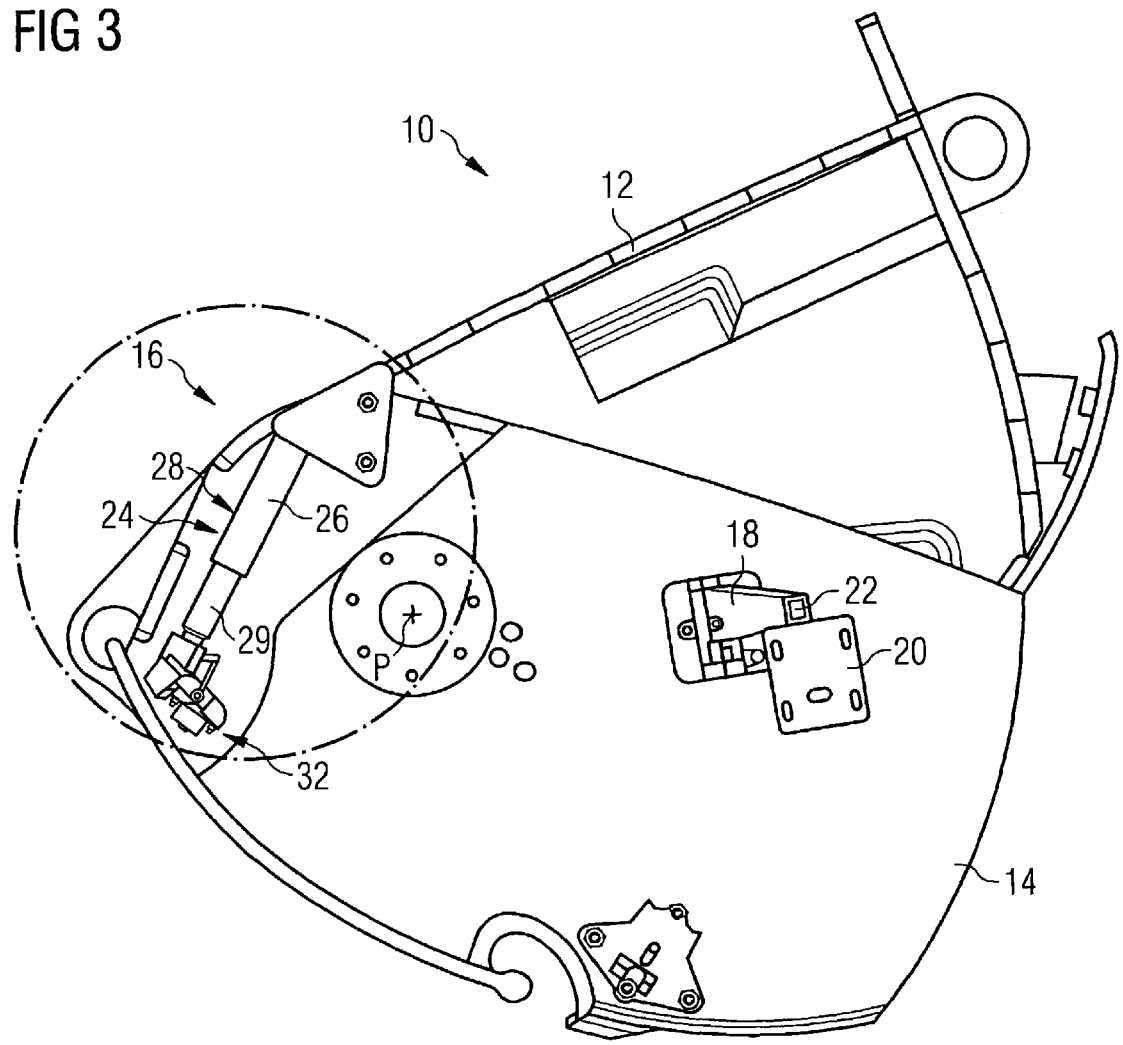
FIG. 3 shows a luggage compartment according to the invention with a lowerable shell in the open state, in which the force assisting device of the force assisting system according to the invention is in its first inactive operating state.

FIG. 1 shows a luggage compartment 10 which is in particular suitable for use in a passenger aircraft and comprises a luggage compartment housing 12, which is attachable to an aircraft structure, and a lowerable shell 14. The lowerable shell 14 of the luggage compartment 10 can be pivoted about a pivot point P between an upper closed position, which is shown in FIG. 1, and a lower open loading and unloading position, which is represented in FIG. 3. Items of luggage can be deposited in the shell 14 and removed from the shell 14 in the lower open loading and unloading position.

In order to reduce a manual force which is required to pivot the lowerable shell 14 out of its lower open loading and unloading position into its upper closed position, the luggage compartment 10 has a force assisting system 16. The force assisting system 16 comprises a load determination device, which is not represented in detail in the figures, for determining a load acting on the lowerable shell 14 of the luggage compartment 10. The load determination device comprises a weighing floor with a weighing plate which forms a floor of the lowerable shell 14 and is mounted on a plurality of weight sensors. The sensors of the load determination device transmit signals to an electronic control unit, which is constructed as an analogue memory-programmable control unit and is likewise not shown in the figures.

As can be seen in particular from FIG. 3, the maximum opening angle of the lowerable shell 14 of the luggage compartment 10 is fixed by a limit stop 18 which is fastened to a side wall of the lowerable shell 14 and, when the lowerable shell 14 is in the lower open loading and unloading position which is shown in FIG. 3, abuts against a stop element 20 which is fastened in a stationary manner to a side wall of the luggage compartment housing 12 which lies opposite the side wall of the lowerable shell 14. A touch sensor 22 is fastened to the limit stop 18, which sensor interacts with the stop element 20 when the lowerable shell 14 is in the lower open loading and unloading position. The touch sensor 22 transmits corresponding signals which indicate the abutment of the limit stop 18 against the stop element 20 to the electronic control unit and thus forms, together with the stop element 20, a state detection device by means of which it is possible to ascertain whether the lowerable shell 14 of the luggage compartment 10 is in its upper closed position or in its lower open loading and unloading position.

The force assisting system 16 also has a force assisting device 24 which comprises a switchable gas pressure spring 28 which is guided telescopically in a hollow cylindrical overtube 26. The overtube 26 is articulated in a rotatable manner to the housing 12 of the luggage compartment 10, which is rigidly fixed to the structure, at a point A. Whereas a first end of the gas pressure spring 28 comprising a cylinder 29 and a piston 30 is held in the overtube 28, a second end of the gas pressure spring 28 is connected in a rotatable manner to the lowerable shell 14 via a mount 31 at a point B.

The force assisting system 16 also comprises an actuating device 32 which comprises an electric stepping motor 34 and a threaded rod 36 which is driven by the stepping motor 34. The threaded rod 36 is connected to a lever 38 which forms a switching device for opening or closing a valve of the gas pressure spring 28. The valve of the gas pressure spring 28 can be opened or closed and the gas pressure spring 28 thereby activated or deactivated by actuating the lever 38. The electric stepping motor 34 of the actuating device 32 is activated by the electronic control unit in dependence on the signals which the electronic control unit receives from the load determination device and the touch sensor 22.

The mode of operation of the luggage compartment 10 and, in particular, the mode of operation of the force assisting system 16 are explained in the following.

Figure 2:
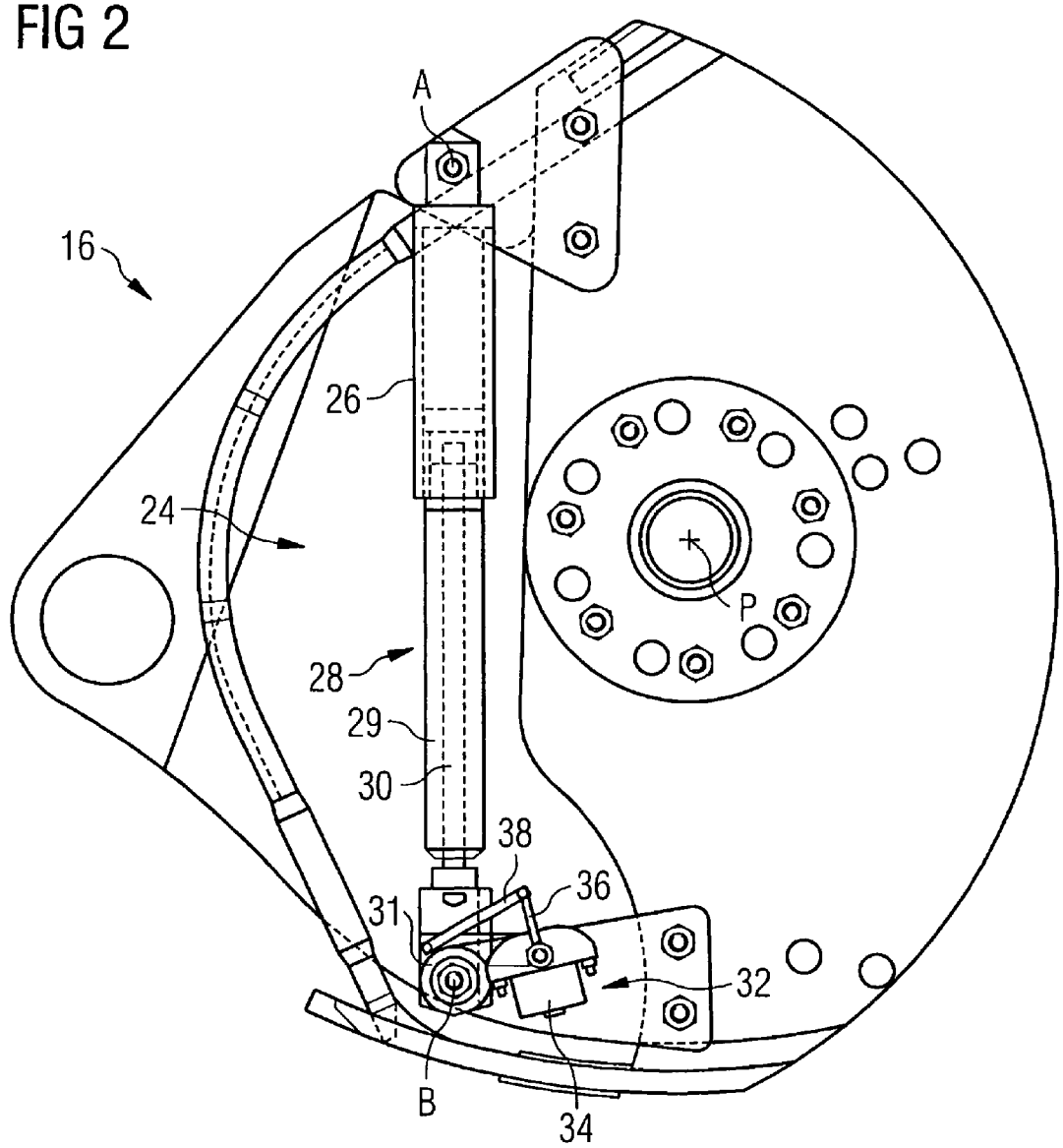
FIG. 2 shows a detail of the luggage compartment represented in FIG. 1 in cross section.
Figure 4:
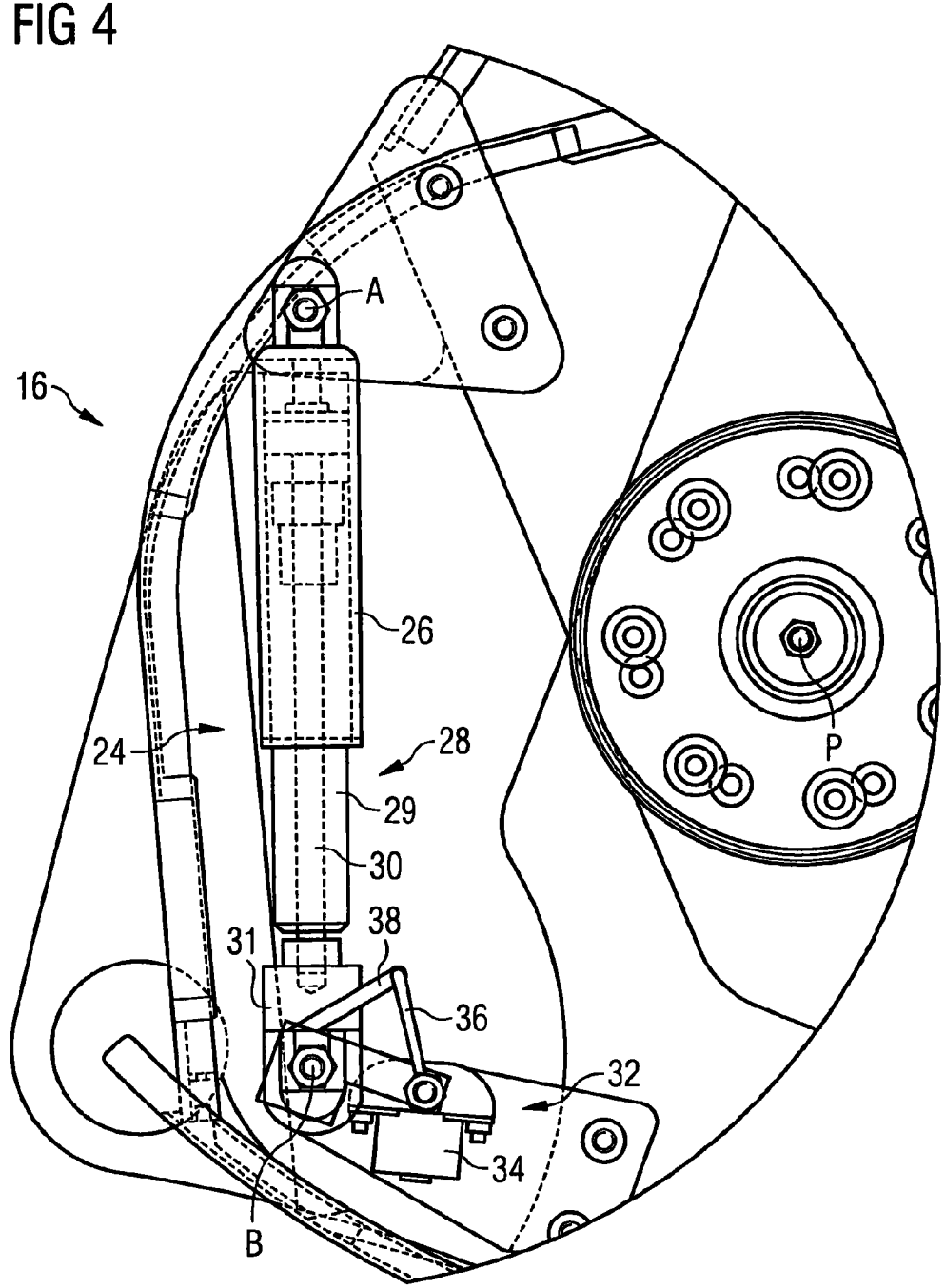
FIG. 4 shows a detail of the luggage compartment represented in FIG. 3 in cross section.
Figure 5:
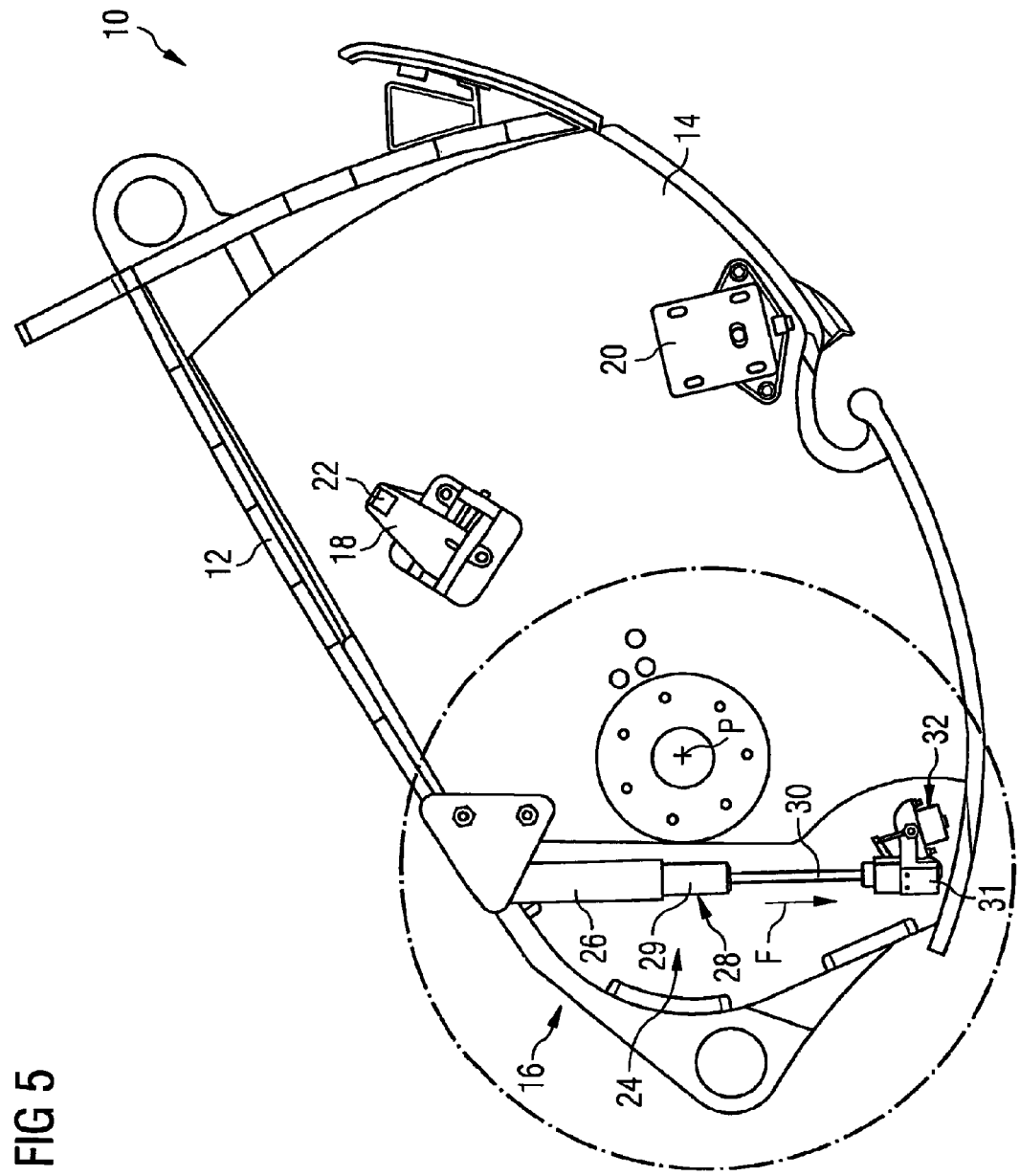
FIG. 5 shows a luggage compartment according to the invention with a lowerable shell in the closed state, in which the force assisting device of the force assisting system according to the invention is in its second active operating state.
Figure 6:
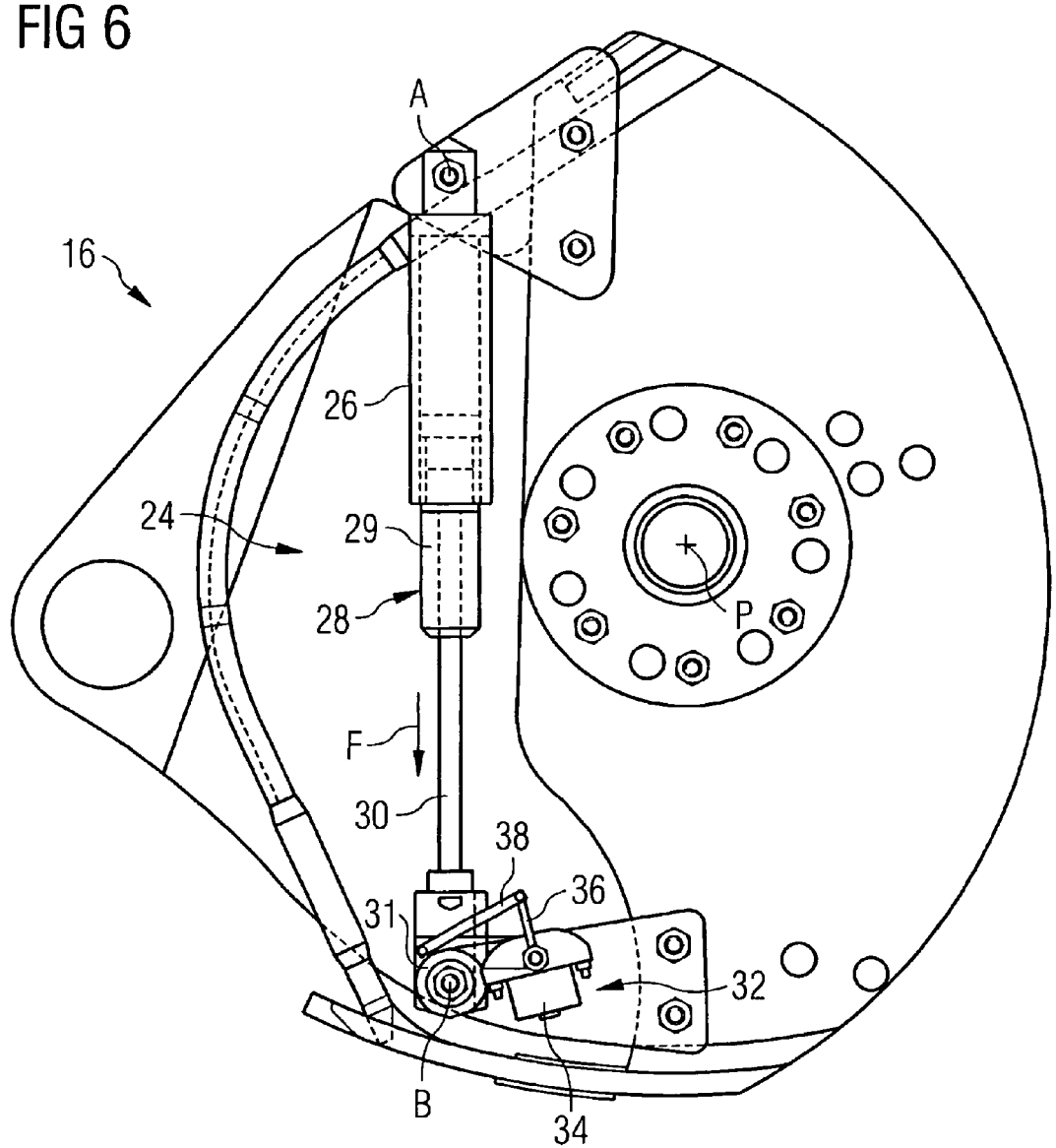
FIG. 6 shows a detail of the luggage compartment represented in FIG. 5 in cross section.
Figure 7:
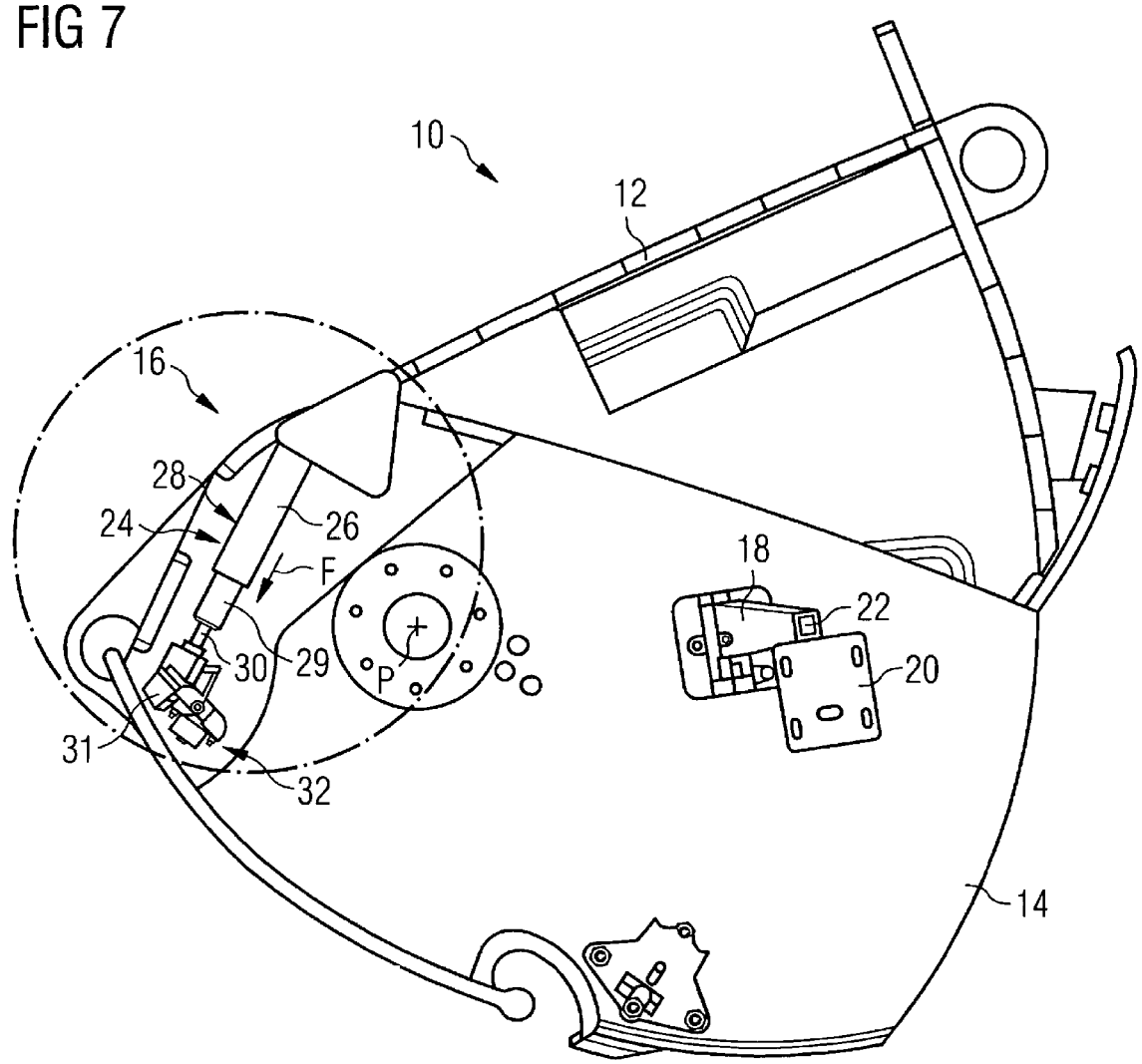
FIG. 7 shows a luggage compartment according to the invention with a lowerable shell in the open state, in which the force assisting device of the force assisting system according to the invention is in its second active operating state.
Figure 8:
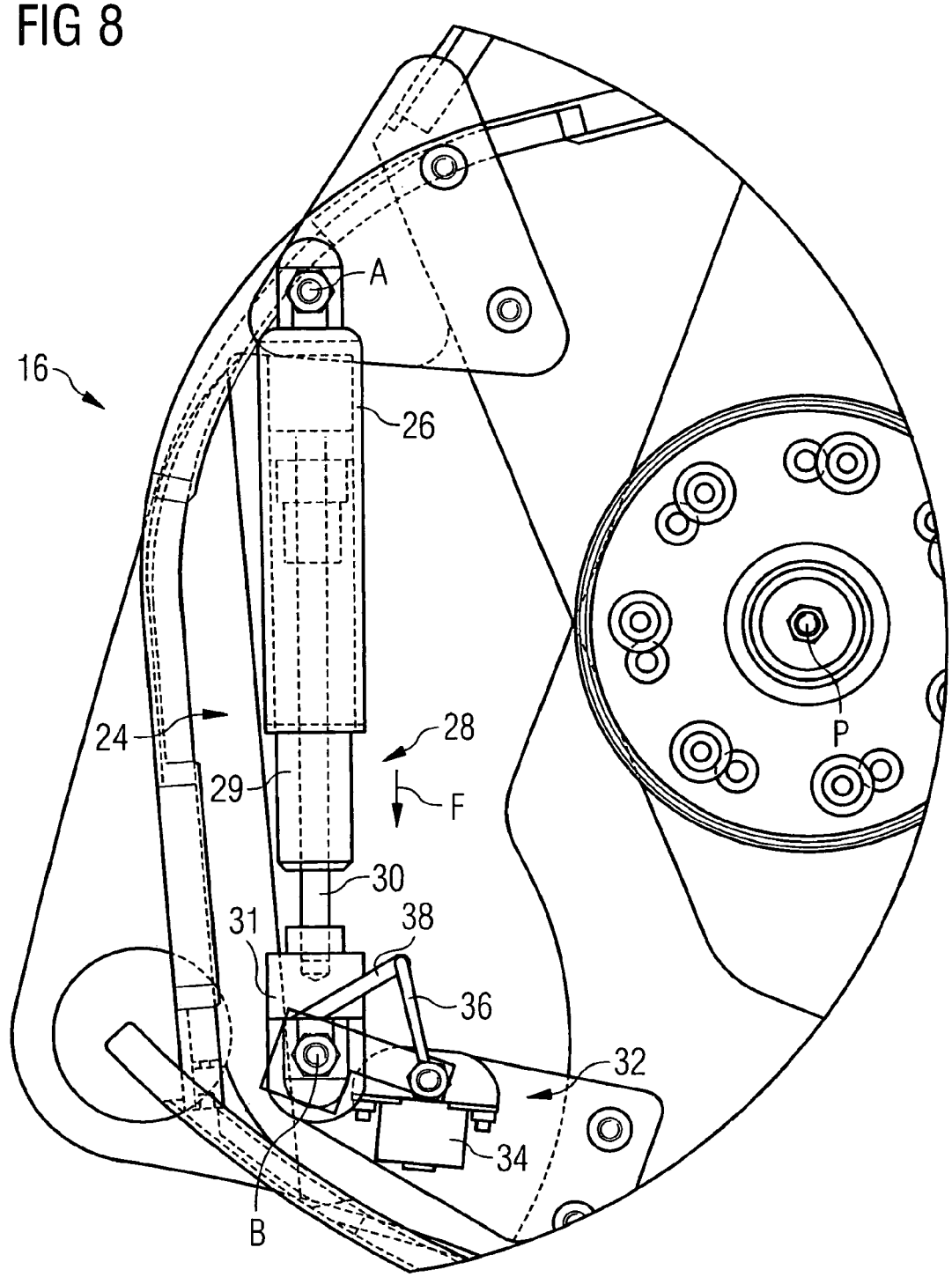
FIG. 8 shows a detail of the luggage compartment represented in FIG. 7 in cross section.

When the luggage compartment 10 is in the unladen state, the valve of the gas pressure spring 28 is open, so that the gas pressure spring 28 does not apply any force to the lowerable shell 14 of the luggage compartment 10. As becomes clear in particular from a comparison of FIG. 1 with FIG. 3 or of FIG. 2 with FIG. 4, the gas pressure spring 28 is displaced telescopically in the overtube 26 when the lowerable shell 14 of the luggage compartment 10 is pivoted between its upper closed position and its lower open loading and unloading position without a relative movement taking place between the cylinder 29 and the piston 30 of the gas pressure spring 28.

When an item of luggage is placed in the lowerable shell 14 of the luggage compartment 10, corresponding signals are sent by the weight sensors of the load determination device to the electronic control unit. The electronic control unit determines from these signals a weight moment applied by the item of luggage to the lowerable shell 14 of the luggage compartment 10 in dependence on its position relative to a pivot point P. As long as the weight moment applied by the item of luggage to the lowerable shell 14 lies below a predetermined threshold value which is stored in the electronic control unit, the electronic control unit does not send any signals to the actuating device 32. If the luggage compartment 10 is designed for a maximum service load of 60 kg, the predetermined weight moment threshold value therefore corresponds to a weight moment which acts on the lowerable shell 14 when an item of luggage weighing 30 kg is introduced into the lowerable shell 14.

On the other hand, if the weight moment ascertained by the electronic control unit on the basis of the signals transmitted by the sensors of the load determination device and acting on the lowerable shell 14 of the luggage compartment 10 exceeds the predetermined weight moment threshold value, the electronic control unit checks on the basis of the signals of the touch sensor 22 whether the lowerable shell 14 of the luggage compartment 10 is in its lower open loading and unloading position. The electronic control unit only delivers a corresponding trigger signal to the actuating device 32 when this is the case.

The electric stepping motor 34 of the actuating device 32 is actuated in response to the trigger signal from the electronic control unit, so that the threaded rod 36 driven by the motor 34 is pushed upwards in the figures. As a result the lever 38 connected to the threaded rod 36 is pushed upwards and the valve of the gas pressure spring 28 is opened. The gas pressure spring 28 consequently applies via the piston 30 an assisting force F and therefore an assisting moment to the lowerable shell 14 of the luggage compartment 10 which opposes the weight force/weight moment acting on the lowerable shell 14 through the item of luggage introduced into the lowerable shell 14 (see FIGS. 5 to 8).

In its active state the gas pressure spring 28 provides a constant assisting force F. Therefore a user only has to apply a manual force reduced by the assisting force F of the gas pressure spring 28 when pivoting the lowerable shell 14 of the luggage compartment 10 out of its lower open loading and unloading position into its upper closed position.

As can be seen from FIGS. 5 to 8, the first end of the gas pressure spring 28 is supported in the overtube 26 when the gas pressure spring 28 is in the active state. A relative displacement which occurs when the lowerable shell 14 of the luggage compartment 10 is pivoted between its lower open loading and unloading position and its upper closed position no longer takes place between the cylinder 29 of the gas pressure spring 28 and the overtube 26, but rather between the cylinder 29 and the piston 30 of the gas pressure spring.

The gas pressure spring 28 is designed such that the assisting force F which it provides can compensate for a weight moment which acts on the lowerable shell 14 when an item of luggage weighing 25 kg is introduced into the lowerable shell 14.

The invention claimed is:

1. A system for reducing the manual force required to move a lowerable shell of a luggage compartment in an aircraft, the lowerable shell being movably coupled to a luggage compartment housing, the system comprising:
    a load determination device for determining a load acting on the lowerable shell of the luggage compartment of the aircraft;
    a state detection device for detecting whether the lowerable shell of the aircraft is in a closed position or an open position;
    a force assisting device having a first inactive operating state and a second active operating state wherein the force assisting device applies a constant assistance force which opposes the load acting on the lowerable shell of the aircraft, the force assisting device including a telescoping member having a first end pivotally coupled to the luggage compartment housing and a second end pivotally coupled to the lowerable shell; and
    an actuating device operatively coupled to the load determination device and the state detection device, the actuating device adapted to move the force assisting device from the first inactive operating state to the second active operating state when both the lowerable shell of the aircraft is detected to be in the open position by the state detection device and the load acting on the lowerable shell of the aircraft is determined to exceed a predetermined threshold value by the load determination device, the actuating device further including an electric motor operatively connected to the second end of the force assisting device,
    wherein the constant assistance force is less than the predetermined threshold value.

2. The system of claim 1, wherein the load determination device determines a weight force acting on the lowerable shell.

3. The system of claim 1, wherein the load determination device determines a weight moment acting on the lowerable shell.

4. The system of claim 1, wherein the state detection device includes at least one of a touch sensor, an optical sensor, an induction sensor, a strain gage, a capacitive distance meter, and a pressure sensor.

5. The system of claim 1, further comprising:
    an electronic control unit configured to receive the load acting on the lowerable shell from the load determination device and the position of the lowerable shell from the state detection device, and configured to automatically control the actuating device based on both the load acting on the lowerable shell and the position of the lowerable shell.

6. The system of claim 1, wherein the electric motor is electric stepper motor.

7. The system of claim 1, wherein the telescoping member of the force assisting device includes a switchable gas pressure spring guided telescopically in a hollow cylindrical overtube.

8. The system of claim 7, and further comprising a lever connected to the actuating device and operatable to control a valve that controls a flow of pressurized gas to the switchable gas pressure spring.

9. An aircraft comprising:
a luggage compartment with a housing and a lowerable shell pivotally coupled to the housing and movable about a pivot point into and out of the housing; and
a system for reducing the manual force required to move the lowerable shell, the system comprising:
- a load determination device for determining a load acting on the lowerable shell of the luggage compartment of the aircraft;
- a state detection device for detecting whether the lowerable shell of the aircraft is in a closed position or an open position;
- a force assisting device having a first inactive operating state and a second active operating state wherein the force assisting device applies a constant assistance force which opposes the load acting on the lowerable shell of the aircraft, the force assisting device including a telescoping member having a first end coupled to the luggage compartment housing and a second end coupled to the lowerable shell; and
- an actuating device operatively coupled to the load determination device and the state detection device, the actuating device adapted to move the force assisting device from the first inactive operating state to the second active operating state when both the lowerable shell of the aircraft is detected to be in the open position by the state detection device and the load acting on the lowerable shell of the aircraft is determined to exceed a predetermined threshold value by the load determination device, the actuating device further including an electric motor operatively connected to the second end of the force assisting device,
wherein the constant assistance force is less than the predetermined threshold value.

10. The aircraft of claim 9, wherein the telescoping member of the force assisting device is positioned adjacent the pivot point of the housing and the lowerable shell.

11. The aircraft of claim 9, wherein the electric motor is an electric stepper motor.

12. The aircraft of claim 9, wherein the telescoping member of the force assisting device includes a switchable gas pressure spring guided telescopically in a hollow cylindrical overtube.

13. The aircraft of claim 12, wherein the lever connected to the actuating device operates a valve controlling a flow of pressurized gas to the switchable gas pressure spring.

* * * * *